Figure 1:
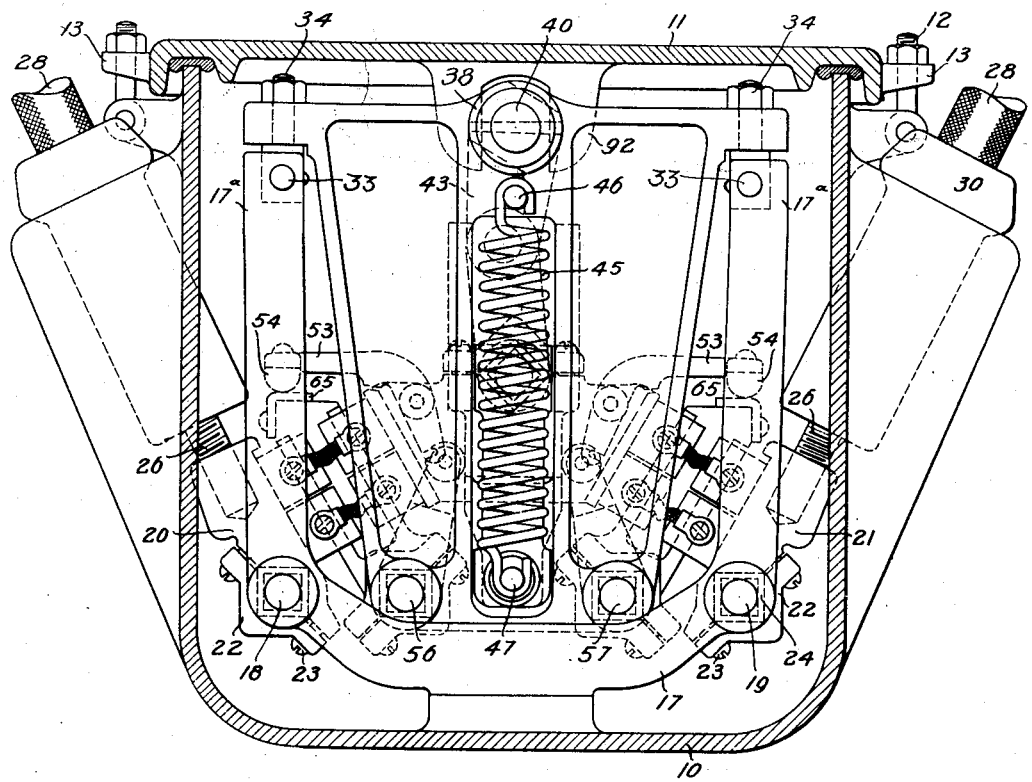

H. W. CHENEY.
SWITCH.
APPLICATION FILED FEB. 4, 1910.

1,088,769.

Patented Mar. 3, 1914.
6 SHEETS—SHEET 1.

H. W. CHENEY.
SWITCH.
APPLICATION FILED FEB. 4, 1910.

1,088,769.

Patented Mar. 3, 1914.
6 SHEETS—SHEET 2.

Witnesses
Rob. E. Seall.
Chas. L. Byron.

Inventor
Herbert W. Cheney
By Chas. E. Lord
Attorney

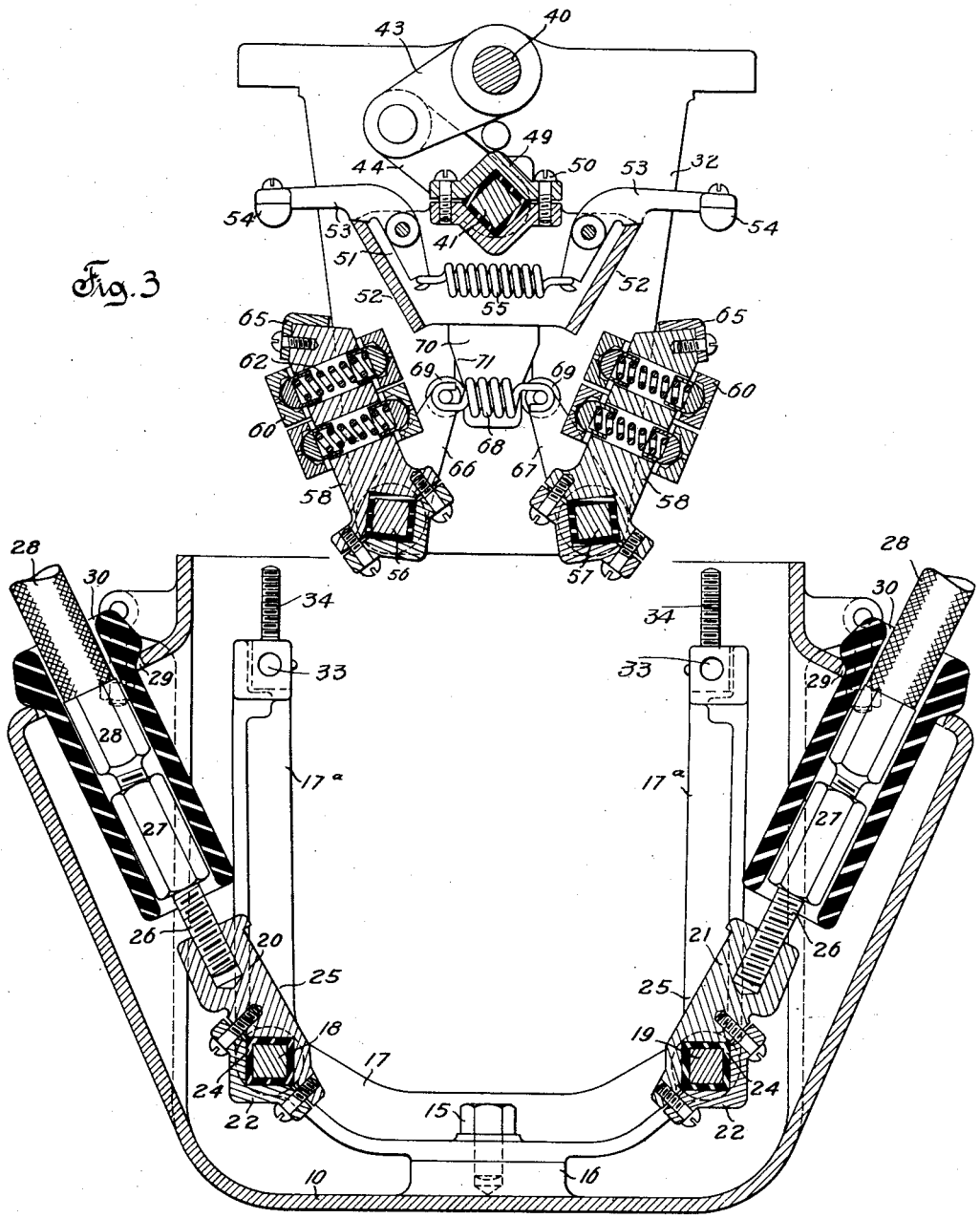

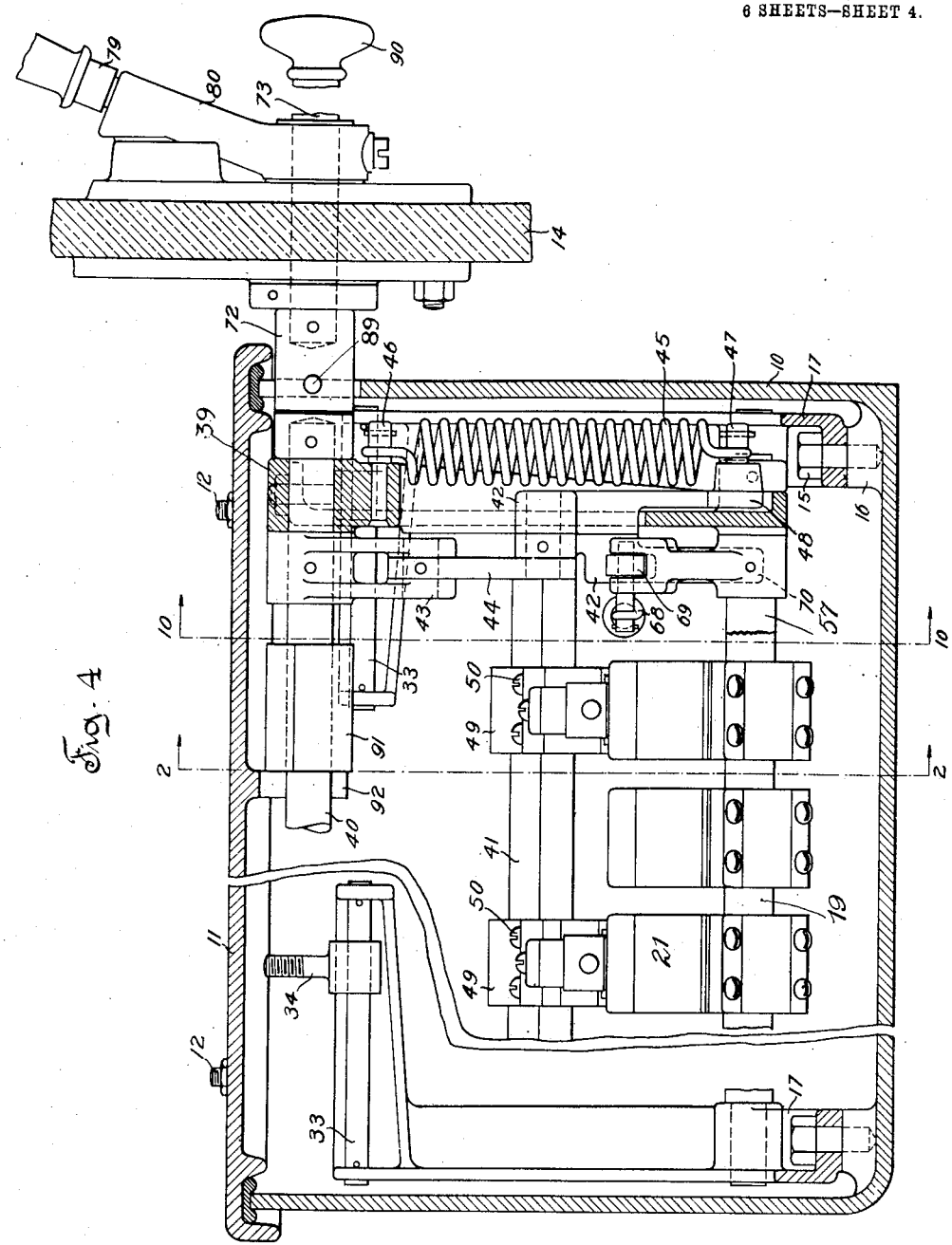

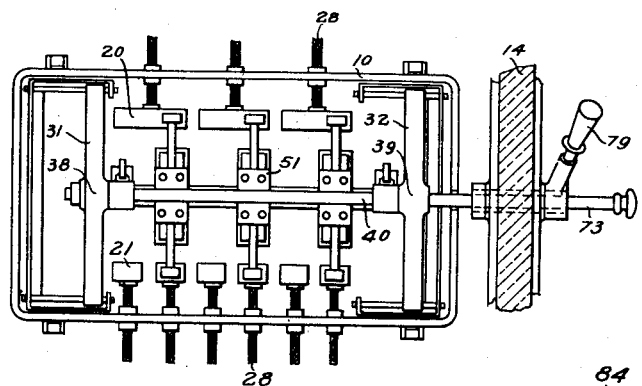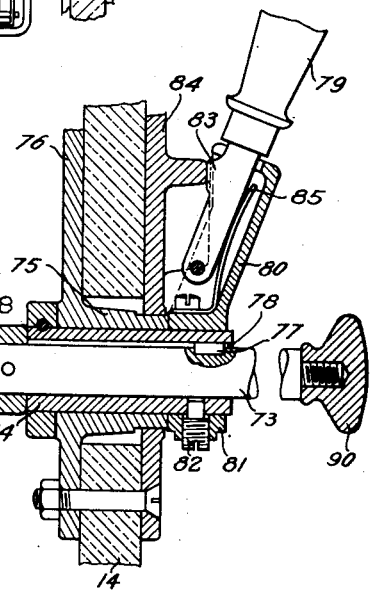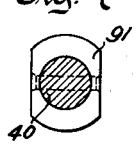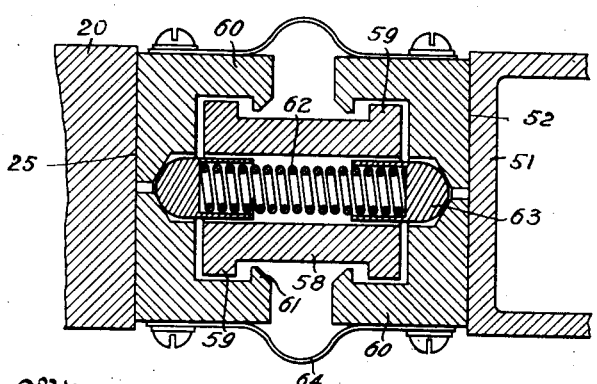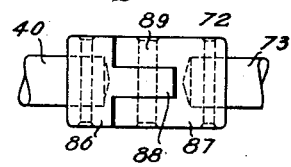

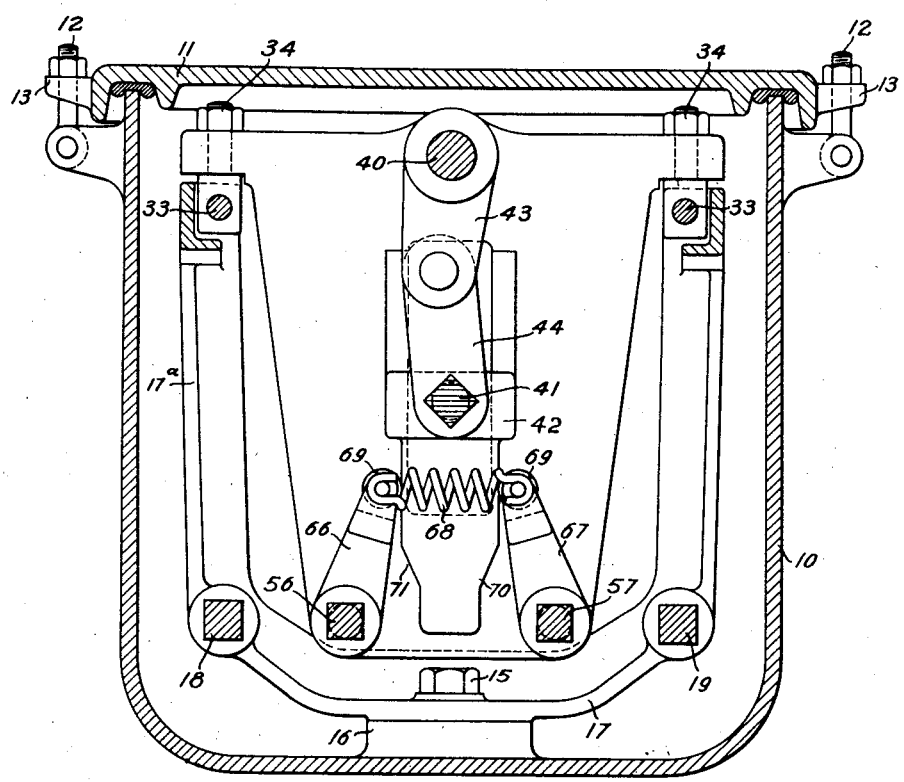

UNITED STATES PATENT OFFICE.

HERBERT W. CHENEY, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

SWITCH.

1,088,769.    Specification of Letters Patent.    Patented Mar. 3, 1914.

Application filed February 4, 1910. Serial No. 542,097.

*To all whom it may concern:*

Be it known that I, HERBERT W. CHENEY, a citizen of the United States, residing at Milwaukee, in the county of Milwaukee and State of Wisconsin, have invented certain new and useful Improvements in Switches, of which the following is a full, clear, and exact specification.

This invention relates to improvements in switches and particularly in oil switches.

In my prior application Ser. No. 407,724, filed December 23, 1907, for improvements in oil switches, I have shown a single throw up-break oil switch in the form of a self-contained unit removable as a whole from the oil tank and from the line terminals, the stationary contact terminals being separable and the portions which are connected to the line terminals being fixed in the tank and the portions which are engaged by the movable bridging contacts forming part of the removable unit. With this construction the parts of the switch, particularly the contacts, can be cleaned, repaired, adjusted, etc., conveniently and with safety, inasmuch as it is unnecessary for the workman or operator to work near any live parts and he will not be compelled to work in cramped quarters or under the disadvantage of a poor light such as frequently exists behind switch boards, nor need he be annoyed by oil dripping from the recently immersed parts as is the case with the usual construction of switches.

The present invention is in some respects an improvement over the switch shown in the above application.

One of the objects of the present invention is the provision of a switch which may be utilized as a double throw switch and having a construction such that the movable or bridging contacts can be caused to coöperate with either of two sets of contacts or contact terminals, without requiring a switch of much larger proportions than is required for a single throw switch.

A further object is to provide a double throw oil switch wherein the coöperating relatively movable contact and operating mechanisms are in the form of a self-contained unit which may be removed as a whole from the oil tank for the purpose of inspection, repairing, adjusting, etc.

Another object is to improve the contact mechanism of switches in general and particularly to provide contacts which engage and disengage each other in a manner such that the engaging faces of the contacts will be maintained in a smooth and clean condition free of grit, dirt and small particles of fused copper.

A still further object is the provision of a novel form of contact mechanism which permits the switch unit to be readily removed and separated from the fixed contact terminals which are connected to the line terminals and which permits the unit to be again restored in the tank and to be more easily and accurately placed in operative relation with respect to the fixed contact terminals than is possible with prior constructions.

My invention may be briefly summarized as consisting in certain novel details of construction and combinations and arrangements of parts which will be described in the specification and set forth in the appended claims.

For an understanding of my invention reference is had to the accompanying sheets of drawings wherein—

Figure 2:
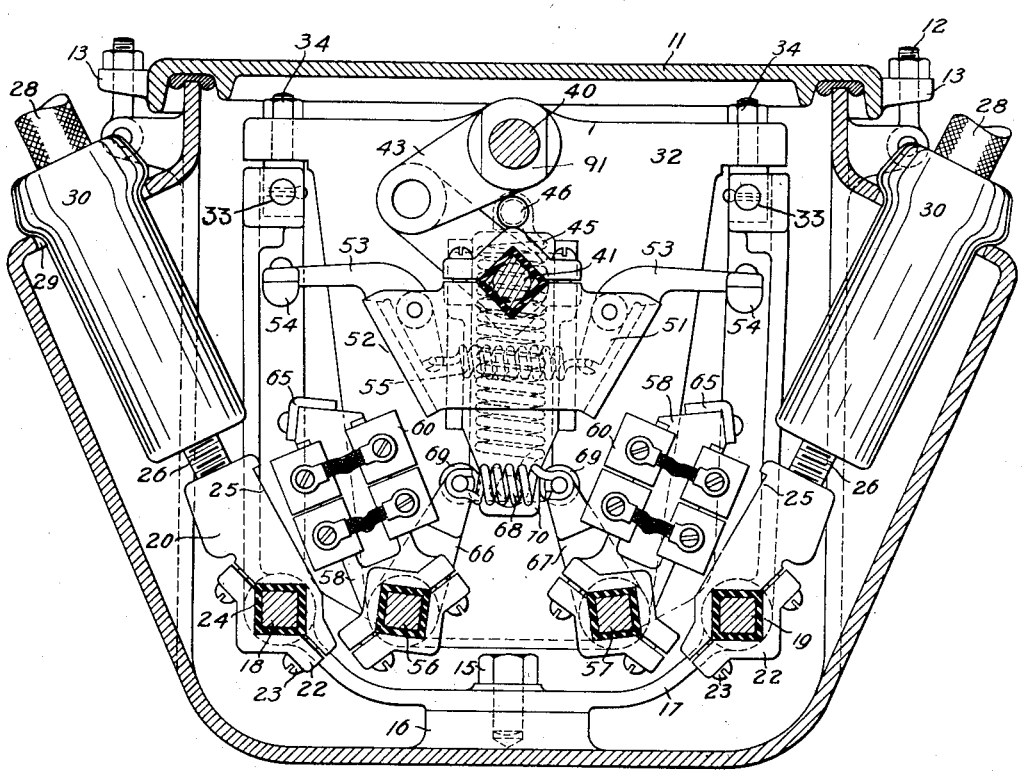

Figure 1 is a vertical transverse sectional view through an oil switch constructed in accordance with my invention. Fig. 2 is a transverse sectional view taken substantially along the line 2—2 of Fig. 4 looking in the direction indicated by the arrows, the switch being here shown in open position. Fig. 3 is a somewhat similar view with the cover removed and the switch unit partially removed from the tank. Fig. 4 is a longitudinal sectional view of the switch, parts being broken away, the section being taken at right angles to the sections shown in Figs. 1, 2 and 3, and at right angles to the switch board, a portion of the latter being also shown in section, and a portion of the operating mechanism being shown in elevation. Fig. 5 is a reduced plan view with the cover removed, the parts being shown somewhat conventionally or diagrammatically. Fig. 6 is a sectional elevation of a portion of the operating mechanism and of a portion of the switch board secured thereto. Fig. 7 is a sectional view through the operating shaft substantially along the line 7—7 of Fig. 6 looking in the direction indicated by the arrows. Fig. 8 is a plan view of a portion of the operating mechanism showing particularly the clutch which is employed between the operating handle and switch. Fig. 9 is an enlarged sectional view showing the co-operating contact members in the relative positions which they occupy when the switch is closed. Fig. 10 is a transverse sectional view taken substantially along the line 10—10 of Fig. 4 looking in the direction indicated by the arrows.

Referring now to the figures of the drawings it will be seen that the switch includes an oil tank 10 which is preferably formed from cast metal and is provided with a removable cover 11 secured to the tank by bolts 12 which pass through the cover and engage in suitable lugs 13 at the corners of the tank. The switch may be supported in any suitable manner but preferably adjacent a switch board 14. Secured by bolts 15 to lugs 16 on the bottom of the tank adjacent opposite ends thereof are two frames or brackets 17, and extending between these brackets and secured to the ends thereof in any suitable manner are two rods or bars 18 and 19 which are parallel and extend substantially the length of the tank. These rods 18 and 19 are designed to support certain contact terminals, the number of which depends upon the number of poles of which the switch is composed. As was before stated, I have here provided a switch which may be utilized as a double throw switch; and it may be here said that in the preferred form of my invention I provide on one side of the switch two sets of stationary contact terminals which are connected respectively to two sets of line or conductor terminals, while on the opposite side of the switch I provide one set of stationary contact terminals which are connected to one set of line terminals, and I connect the single set of contact terminals on one side of the switch to either of the two sets of contact terminals on the other side by movable or bridging contact mechanism which is designed to be shifted bodily lengthwise of the switch, and when in one position is adapted to bridge or to connect the set of contact terminals on one side of the switch to one of the sets on the opposite side, and when in another position is adapted to bridge or to connect the first set of contact terminals to the other set of contact terminals on the opposite side of the switch. Accordingly for each pole of the switch I have three contact terminals, one terminal adapted to be connected by the movable contact mechanism to either of the other two depending upon the position of the movable contact mechanism. I have here shown a three-pole switch and therefore the rod 18 carries three stationary contact terminals 20, and the rod 19 carries six stationary contact terminals 21. The contact terminals are clamped to the rods 18 and 19 by caps 22 and screws 23, the rods being preferably squared as shown, and the terminals being separated from the rods by insulation 24. Each contact terminal is provided with an inclined flat face 25 which is adapted to be engaged by certain contact members to be referred to presently, and each terminal has at its upper end a threaded socket in which is secured a terminal rod 26 connected by a right-and-left-hand threaded coupler 27 to a line terminal 28. The line terminals 28 extend from the tank through openings 29 provided at the side near the top of the tank, and these terminals as well as the connections with the rods 26 are surrounded by insulating bushings 30 which also extend through the openings 29. These bushings may be slid up onto the line terminals so as to expose the connections and permit the line terminals to be separated from the rods 26.

By referring to Fig. 5 wherein the stationary contact terminals are shown somewhat conventionally in order that the relative arrangement and sizes of these contacts may be made clear, it will be seen that the contact terminals 20, which are mounted on rod 18, are considerably longer than the contact terminals 21, which are mounted on rod 19. It will be seen also that two of the contact terminals 21 are directly opposite each of the longer contact terminals 20.

The mechanism so far described constitutes the fixed or normally non-removable part of the switch. The remaining part of the contact mechanism of the switch is mounted in a removable skeleton structure including two end plates 31 and 32 which are held predetermined distances apart by members to be referred to presently, and are supported on guide rods or supporting bars 33 which are in turn supported by extensions 17ª which are formed integrally with the frames or brackets 17, these end plates being so supported that they, together with the mechanism carried thereby, may be shifted longitudinally of the tank and may be removed as a unit from the tank. In this case the end plates are provided with eye-bolts 34, the eye portions of which receive the guide rods 33 upon which the end plates 31 and 32 slide.

Supported in bearings 38 and 39 at the tops of the end plates 31 and 32 is a rotary or oscillatory operating shaft 40, and mounted for vertical movement below this shaft 40 and adapted to be shifted thereby is a vertically movable horizontal rod 41 which is guided in its vertical movements by members 42 which are secured to the ends of the rod 41 and engage in vertical slots in the end plates. These members 42, therefore, serve as cross heads for the rod 41 and also serve as camming members to shift certain other parts when the rod 41 and the parts supported thereby are lowered as will be explained presently. The shaft 40 by its rotary movement shifts the rod 41 vertically by means of cranks 43 which are secured to the shaft 40 between the end plates 31 and 32, and by means of links 44 which are pivoted to the cranks 43 and are also pivotally connected to the rod 41. The downward movement of the rod 41 is opposed by coil springs 45, the upper ends of which are connected to pins 46 projecting laterally from the end frames 31 and 32, and the lower ends to pins 47 projecting outwardly from arms 48 which form parts of the members 42 and are movable with the rod 41, the arms 48 extending along the outer sides of the frames 31 and 32 as is shown in Fig. 4.

Supported on the rod 41 and clamped thereto by caps 49 and screws 50 are three movable bridging contacts or contact members 51, there being one bridging contact for each pole of the switch, and each being adapted to connect one of the longer contact terminals 20 with either one of the two shorter contact terminals 21 which are located opposite such contact terminal 20. The arrangement of the bridging contacts relative to the stationary contact terminals will be best understood by referring to Fig. 5. Each of the bridging contacts is preferably in the form of a hollow or box-like shell which is provided on opposite sides with two inclined faces 52 parallel at all times to the inclined faces 25 of the contact terminals 20 and 21 respectively. Each bridging contact 51 has pivoted thereto two arms or levers 53 at the outer ends of which are auxiliary or arcing contacts 54. The inner and lower ends of these contact levers 53 are connected together by a coil spring 55 shown most clearly in Figs. 2 and 3, this spring serving to hold the arcing contacts 54 in their lowermost positions. The bridging contacts 51 do not engage directly the stationary contact terminals 20 and 21, as is the case in the usual construction of switches, but I have provided between the bridging contacts and the stationary contact terminals 20 and 21 additional contact members which will now be described.

Extending between the lower ends of the end frames 31 and 32 and mounted so that they may have a slight rocking movement are two rods or bars 56 and 57, each of which is provided with three contact-supporting arms 58 which are normally inclined and are arranged in pairs, the arms of each pair being located directly opposite each other and being below the inclined faces 52 of one of the bridging contacts 51. Each of these arms is provided along opposite sides, as is shown in Fig. 9, with flanges or ribs 59, and each has loosely mounted thereon a plurality of relatively movable substantially U-shaped contact members 60 provided with inwardly extending flanges 61 forming grooves which receive loosely the flanges 59 on the arms 58. These contact members 60 are arranged in pairs as is shown clearly in the drawings, the members of each pair coöperating with a bridging contact and a contact terminal respectively and being spread apart by coil springs 62 which are located in transverse openings in the arm 58 as shown. The ends of the coil springs 62 are received in sockets or thimbles 63, the outer ends of which are rounded as shown and are received in sockets on the inner sides of the contact members 60. Thus it will be seen that with this construction the contact members 60 located on opposite sides of the arm 58 are capable of movement toward and away from each other, and it may be here stated that these contact members are adapted to be compressed between the bridging contact members 51 and the stationary contact terminals 20 and 21. Each pair of contact members 60, or all the contact members 60 on an arm 58, may be considered as forming one compressible intermediate contact. The contact members 60 of each pair are preferably connected together by flexible conductors 64 so that there will be good conductivity between the stationary contact terminals and the bridging contacts, and the outer ends of the arms 58 are provided with arcing tips 65 which are adapted to be engaged by the arcing contacts 54 carried by the contact levers 53.

As will be seen by referring particularly to Fig. 2, the contact-supporting arms 58 are normally so inclined that the contact members 60 carried by these arms are out of engagement with the fixed contact terminals and also with the bridging contacts. However, I have provided means whereby the contact members 60 on the lower or outer sides of the arms 58 are brought down into engagement with the inclined faces 25 of the contact terminals 20 and 21 just before the switch is closed or before the bridging contacts are brought into engagement with the contact members 60 on the inner or upper faces of the arms 58 and this is accomplished by the following construction.

Secured to the ends of the rods 56 and 57 are two pairs of levers or arms 66 and 67, each pair being connected together by a coil spring 68 and being provided at their upper ends with rollers 69. As was previously stated the rod 41 carrying the bridging contacts is guided in its vertical movement by combined camming and cross head members 42. It was also stated that these members have arms 48 projecting downwardly along the outer sides of the end frames 31 and 32. The members 42 are also provided along the inner sides of the end frames with arms 70 having, a short distance from their lower ends, inclined or cam faces 71 which, when the switch is being closed and the arms 70 move downwardly, and before the bridging contacts engage the intermediate contact members 60, engage the rollers 69 at the free ends of the lever arms 66 and 67 and spread these arms 66 and 67 so as to rock slightly the rods 56 and 57 and cause the contact members 60 adjacent the stationary contact terminals 20 and 21 to engage the inclined faces 25 of the latter. Above the cam faces 71 the arms 70 have parallel faces which are engaged by the rollers during the final closing movements of the switch. After the intermediate contact members 60 engage the contact terminals, the bridging contacts 51 are brought down onto the adjacent contact members 60, the engagement between these members taking place before the movable switch members complete their closing or downward movement, so that by such completion the U-shaped parts of the pairs of contact members 60 are shifted toward one another or are compressed between the contact terminals and bridging contacts. This yielding action of the contact members 60 during the final closing movements of the switch and after the contact members 60 are engaged by the bridging contacts, causes a relative sliding movement between the bridging contacts and the adjacent contact members 60 with the result that there is a wiping and cleaning action between the adjacent contact or engaging faces. The auxiliary contacts 54 engage the arcing tips 65 just before the bridging contact members engage the contact members 60 when the switch is being closed, and when the switch is being opened the bridging contacts are first separated from the contact members 60 and then the auxiliary contacts 54 are separated from the arcing tips 65, after which the arms 58 carrying the intermediate contact members 60 are shifted inwardly or toward each other and the contact members 60 move out of engagement with the stationary contact terminals, this inward movement of the arms 58 and of the intermediate contact members 60 being caused by the springs 68 when the rollers 69 ride down on the inclined faces 71 of the camming members 70. It will be seen, therefore, that the circuit is broken at each pole of the switch before the intermediate contact members leave the stationary contact terminals, and as a result the arcing will take place only between the auxiliary arcing contacts 54 and 65, and perhaps to a slight extent between the bridging contacts and the adjacent contact members 60. The aforesaid wiping and cleaning action takes place between these members, and therefore the contacting or engaging faces of these members will be maintained in a clean condition, and the contacts will, therefore, have much longer life than the contacts of ordinary switch constructions. The bridging contacts and the intermediate contact members 60, the latter of which, in a sense, constitute part of the stationary contact mechanism, are included in the unit which is removable from the tank.

The end of the shaft 40 is connected by means of a clutch 72 to a rod 73 extending through a bushing 74 which is mounted for rotary movement in a flange 75 of a plate 76 secured to the inner face of the panel adjacent the switch, the flange projecting outwardly through an opening in the panel. This rod 73 is adapted to be given a rotary movement when the switch is being opened or closed, and is also capable of endwise movement in the bushing 74, and for this purpose the rod 73 is provided with a key 77 which engages within a horizontal slot 78 extending longitudinally of the bushing. The rod 73 is adapted to be turned so as to open and close the switch by a suitable handle consisting preferably of two parts 79 and 80, the portion 80 having a sleeve 81 which receives and is secured by a set screw 82 to the bushing 74, and the portion 79 of the handle being pivoted to the portion 80 and having a tongue 83 which coöperates with suitable notches in a plate 84 which is secured to the outer side of the switch panel. The portion 79 of the handle is pressed toward the notches of the plate 84 by means of a leaf spring 85. The construction of the handle is similar to the construction of the switch handle disclosed in my prior application previously referred to and need not be further described in this application.

As before stated the operating shaft 40 is connected to the rod 73 by a clutch 72. This clutch includes two principal parts 86 and 87, the part 86 being secured to the end of the shaft 40 and being provided with a tongue 88, and the part 87 of the clutch being secured to the end of the rod 73 and having a slot which receives the tongue 88. Endwise movement of the two coöperating members of the clutch is prevented by a pin 89 which passes transversely across the slot in the portion 87 of the clutch and is engaged by a suitable hook-shaped portion of the tongue 88. When the switch is open and the handle is in "off" position, the tongue 86 and slot which it engages are vertical, and when these members are in vertical position the switch unit, including the skeleton frame, bridging contacts, the intermediate contact members and the operating mechanism for these contact members, may be removed as a whole from the tank. The unit cannot be removed from the tank, however, unless the coöperating tongue and slot of the clutch 72 are vertical and the switch is in open position, and the unit cannot be replaced in the tank unless the parts are in the same position. By forming the operating parts of the switch in a unit which can be removed as a whole without disturbing the line terminals or stationary contact terminals, the parts can be very readily cleaned, repaired or adjusted or can have any other labor performed on them with absolute safety to the workmen, for the reason that the unit can be removed from all live parts, at a distance from the oil tank and switch board if necessary. The operator, therefore, can work free from obstructions and live parts, and will not be under the disadvantages that he usually encounters when working behind a switch board and working on the parts of ordinary switch constructions.

As before stated the switch unit is capable of endwise movement in the tank so that the contact terminals 20 can be connected by the bridging contact members 51 and intermediate contact members 60 to either of the two sets of contact terminals 21. Consequently the rod 73 which is connected by the clutch to the operating shaft 40 is mounted in the bushing 74 for endwise or longitudinal movement, and is provided at its end with a knob 90 by means of which the switch unit may be shifted horizontally from one position to another so that the bridging contacts and intermediate contact members are moved from a position in line with one set of stationary contact terminals 21 to a position in line with the other set, although in this movement of the unit the bridging contacts will be in line with the same fixed contact terminals 20.

An important feature of my invention resides in the means which I have provided for preventing the shifting of the switch unit in the manner above described, except when the switch is open. This is accomplished, in this case, by a mechanical interlock consisting of a sleeve 91 which is secured to the shaft and is provided with two flat faces, and of a fork or slotted lug 92 which extends downwardly from the cover. These parts are so arranged that to shift the switch unit from one operative position to another, the sleeve 91 must be shifted from one side of the fork or notched lug 92 to the other, and the distance between the parallel flat faces of the member 91 and the position of the latter are such that this member 91 will pass between the arms of the fork 92 only when the switch is open. This construction also prevents the closing of the switch unless the switch unit is in one or the other extreme position.

By providing a switch unit which can be removed only when the switch is open, and by providing in a double throw switch means for preventing the shifting of the unit from one operative position to another except when the switch is open, the removal of the switch unit or its shifting from one position to another can be accomplished with absolute safety to the operator and to the switch, inasmuch as in either case the contacts of the movable and removable unit are dead.

It will be seen that the arrangement and construction of contact mechanism which I have provided, is particularly adapted for use in connection with a switch having a self-contained removable unit such as disclosed in this application and in my prior application previously referred to, for the reason that the intermediate contact members, which may be considered part of separable stationary contact members, are out of engagement with the stationary contact terminals to which the line terminals are connected when the switch is open. Consequently in restoring the switch unit to position in the tank, it is unnecessary that two coöperating members of stationary contact terminals be fitted together with great accuracy as would be the case if parts of the stationary contact mechanism were moved out of engagement on the removal of the unit and were again fitted into engagement or in conductive relation on the restoration of the unit. However, this idea of separating the intermediate contact members from the stationary contact terminals upon the opening of the switch, by making rotatable the rods 56 and 57 on which said intermediate contact members are mounted, is not my invention and is not covered specifically in my claims. It will be seen also that the construction and arrangement of the contact members and the manner in which they are shifted into and out of engagement, are such that the engaging faces of the contact members and particularly the faces between which arcing may take place will be maintained in a smooth and clean condition, and as a result arcing will have a less detrimental effect on the contact members than in the usual switch constructions. It will be apparent also that by arranging two sets of contact terminals on one side of the oil switch and a single set on the opposite side, and by providing a unit which may be shifted endwise in the oil tank so that the single set of terminals on one side of the switch may be connected to either of the sets on the opposite side in the manner above described, I am able to provide a double throw switch which is compact and is very little larger than a single throw switch.

I do not desire to be confined to the exact details shown but aim to cover all modifications which do not involve a departure from the spirit and scope of my invention as set forth in the appended claims.

What I claim as new and desire to secure by Letters Patent is:—

1. In a double throw switch, two parallel supporting bars, a contact terminal mounted on one of said bars and two contact terminals mounted on the other supporting bar opposite the contact terminal on the first supporting bar, and means for connecting the contact terminal on the first bar to either of the contact terminals on the second bar.

2. In a double-throw switch, a pair of stationary contact terminals, a movable contact member, said movable contact member being shiftable substantially rectilinearly from one position to another, and when in one position being movable substantially rectilinearly into and out of connection with one contact terminal, and when in another position being similarly movable in the same direction into and out of connection with the other contact terminal.

3. In a double throw switch, a stationary contact terminal, a pair of stationary contact terminals arranged side by side opposite the first named contact terminal, a movable bridging contact member movable rectilinearly toward and away from the said contact terminals, and means whereby the normal position of said movable contact member may be shifted rectilinearly so that when it is in one position and the switch is closed by one movement it will connect the first named contact terminal to one of said pair of contact terminals and when in another position and the switch is closed by a movement in the same direction, it will connect said first named contact terminal to the other of the pair of contact terminals.

4. In a double throw switch, a stationary contact terminal, a pair of contact terminals either one of which is adapted to be connected to the first named contact terminal, a bridging contact member adapted to be shifted vertically to open and close the switch, and means whereby said bridging contact member may be moved from one plane of movement to a substantially parallel one so that when in one position and shifted vertically it will coöperate with the first named contact terminal and with one of the pair of contact terminals and when shifted to another position and moved vertically it will coöperate with the first named contact and with the other of the pair of contact terminals.

5. In a double-throw switch, a pair of contact terminals arranged side by side, a single contact terminal adapted to be connected to either of the pair of contact terminals, and a bridging contact member, said bridging contact member having two substantially parallel normal positions and when in one position being movable into and out of connection with the single terminal and one of the pair of terminals, and when in the other position being similarly movable into and out of connection with the single terminal and the other of the pair of terminals.

6. In a double-throw switch, a pair of contact terminals arranged side by side, a single contact terminal adapted to coöperate with either of said pair of contact terminals, a movable bridging contact, a support therefor, and means for shifting said movable bridging contact and support from one position to a substantially parallel one, and for moving it in the same direction when in said two positions into and out of connection with the single contact terminal and one of the pair of contact terminals and with the single contact terminal and the other of the pair of contact terminals respectively.

7. In a double throw switch, a pair of contact terminals arranged side by side, a single contact terminal spaced therefrom and arranged opposite the same, a movable bridging contact, a support for said movable bridging contact, said support and movable contact being adapted to be shifted from one normal position to a substantially parallel one so that by movements in the same direction it may connect the single contact terminal to either one of the pair of contact terminals, and means whereby said support and movable contact can be shifted only when the switch is open.

8. In combination, in a double throw switch, a pair of contact terminals, a single contact terminal arranged opposite the pair of contact terminal, a bridging contact movable in a substantially vertical plane, said bridging contact being movable horizontally from a plane such that it may connect the single contact terminal to one of the pair of contact terminals to a substantially parallel plane such that it may connect the single contact terminal to the other of the pair of contact terminals.

9. In combination, in a double throw switch, a pair of contact terminals, a single contact terminal arranged opposite the same, a bridging contact movable in a substantially vertical plane, said bridging contact being movable horizontally from a plane such that it may connect the single contact terminal to one of the pair of contact terminals to a substantially parallel plane such that it may connect the single contact terminal to the other of the pair of contact terminals, and means whereby said movable bridging contact may be shifted horizontally only when the switch is open.

10. In a double throw multipole switch, a set of contact terminals one for each pole of the switch, two sets of contact terminals adapted to coöperate therewith, movable bridging contacts rectilinearly movable when in one position and by a movement in one direction to connect the first set of contact terminals to one of the two sets of contact terminals, and means whereby the normal position of said movable bridging contacts may be changed parallelly so that when shifted in the same direction said movable bridging contacts connect the first set of contact terminals to the other of the two sets of contact terminals.

11. In a double throw switch, a support having a plurality of contact terminals secured thereto, a second support having two sets of contact terminals secured thereto, a plurality of movable bridging contacts adapted to be moved in one direction to close the switch, and means whereby said bridging contacts and said two sets of contact terminals may be rectilinearly moved relatively to each other transversely to said direction whereby the terminals on the first named support may be connected to either set of terminals on the second named support.

12. In a double throw switch, a support having a plurality of contact terminals secured thereto, a second support having two sets of contact terminals secured thereto, a plurality of movable bridging contacts adapted to be moved in one direction to close the switch, and means whereby said bridging contacts and said two sets of contact terminals may be rectilinearly moved relatively to each other transversely to said direction of movement only when the switch is open.

13. In a double throw oil switch, a support, a plurality of contact terminals secured thereto, a second support having a plurality of sets of contact terminals secured thereto, a plurality of bridging contacts movable in vertical planes when the switch is being opened or closed, and means whereby said contacts may be shifted horizontally from one position to a substantially parallel one so that when in one position they may connect the terminals on the first named support with one set of terminals on the second named support and when in another position they may connect the terminals on the first named support with another set of terminals on the second named support.

14. In a double throw oil switch, a support, a plurality of contact terminals secured thereto, a second support having two sets of contact terminals secured thereto, a plurality of bridging contacts movable in vertical planes when the switch is being opened or closed, means whereby said contacts may be shifted horizontally from one position to a substantially parallel one so that when in one position they may connect the terminals on the first named support with one set of the terminals on the second named support and when in another position they may connect the terminals on the first named support with the other set of terminals on the second named support, and means for preventing the horizontal shifting of the movable contacts except when the switch is open.

15. In a switch, a stationary contact terminal, a movable contact adapted to be shifted toward and away from the same, and a compressible contact member which is compressed between the contact terminal and the movable contact when the latter is moved toward said contact terminal.

16. In combination, in an oil switch, an oil tank, stationary terminals in the tank, and a self-contained switch unit, supports for said unit arranged inside of said tank, said unit being movable longitudinally of the tank along said supports and being removable from the tank.

17. In an oil switch, an oil tank, stationary terminals in said tank, a self-contained switch unit in the tank and including contact members which coöperate with said terminals, supporting and guiding members within said tank, and members for securing the unit to said supporting and guiding members, said unit being movable longitudinally of the tank and being removable from the tank.

18. In a double throw multipole switch, a set of contact terminals, two other sets of contact terminals, two contact terminals of the two latter sets respectively being arranged side by side and opposite each contact terminal of the first set, and bridging contacts one for each contact terminal of the first set for connecting said contact terminals respectively to the terminals of either of the two sets of contact terminals.

19. In a double throw multipole switch, a support having a plurality of contact terminals secured thereto, a second support having two sets of contact terminals secured thereto, the individual contact terminals of said two sets being alternately arranged on said second support, and a plurality of movable bridging contacts for connecting the contact terminals on the first support to the respective contact terminals of either set on the second support.

20. In a double throw switch, a plurality of fixed contacts, a movable contact movable rectilinearly to coöperate with said fixed contacts, and an operating shaft for the movable contact, said shaft having a rotary movement for opening and closing the switch and an axial movement for shifting the movable contact to cause it to coöperate with different ones of said fixed contacts.

21. In a double throw oil switch, an oil tank, a plurality of contact terminals located in said tank, a removable unit including a movable switch member and a shaft, and a second or operating shaft, said two shafts being connected when the removable unit is in place in the tank and having a rotary movement to move the movable contact to open and closed position and an axial movement to make the movable contact coöperate with different ones of said contact terminals.

22. In a switch, a pair of stationary contact terminals, a bridging contact member adapted to be moved toward and from said contact terminals, and a pair of compressible intermediate contact members which are compressed between the bridging contact member and the respective stationary contact terminals when the switch is closed.

23. In an oil switch, an oil tank, a stationary contact terminal located in said tank, and switch mechanism removable from the tank as a unit and comprising a movable contact and a compressible intermediate contact, said intermediate contact being compressed between the stationary contact terminal and the movable contact when the switch mechanism is in place in the tank and the switch is closed.

24. In an oil switch, an oil tank, a stationary contact terminal located in said tank, switch mechanism removable from the tank as a unit and comprising a movable contact and a compressible intermediate contact, said compressible intermediate contact being compressed between the stationary contact terminal and the movable contact when the switch mechanism is in place in the tank and the switch is closed, and means for preventing the removal of the removable switch mechanism unless the switch is open.

25. In an oil switch, an oil tank, a pair of rods fixed therein, one or more pairs of stationary contact terminals mounted on said rods, the two terminals of a pair being on different rods, and removable switch mechanism comprising a frame including a second pair of rods, one or more pairs of compressible contact members mounted on said second pair of rods, the two members of a pair being on different rods, and one or more bridging contacts being compressed between a bridging contact and the two members of a pair of stationary contact terminals when the switch mechanism is in place in the tank and the switch is closed.

26. In an oil switch, an oil tank, a pair of rods fixed therein, one or more pairs of stationary contact terminals mounted on said rods, the two terminals of a pair being on different rods, and removable switch mechanism comprising a frame including a second pair of rods, one or more pairs of compressible contact members mounted on said second pair of rods, the two members of a pair being on different rods, one or more bridging contacts, the two members of a pair of compressible contact members being compressed between a bridging contact and the two members of a pair of stationary contact terminals when the switch mechanism is in place in the tank and the switch is closed, and means for preventing the removal of the removable switch mechanism unless the switch is open.

27. In a switch, a stationary contact terminal, a movable contact member, and a two-part intermediate contact member movable as a unit with said movable contact member and engageable with and disengageable from the contact terminal when moved as a unit with said movable contact member, one part of the intermediate contact member being yieldable upon engagement with the stationary terminal and the other part upon engagement by the movable contact member.

28. In an oil switch, an oil tank, a stationary contact terminal located in said tank, and removable switch mechanism comprising a movable contact and an intermediate contact, the latter being interposed between and engaged by said movable contact and engaging said stationary contact terminal when the movable switch mechanism is in place in the tank and the switch is closed and comprising two yieldable parts for engagement by the movable contact and with the stationary contact terminal respectively.

29. In an oil switch, an oil tank, a pair of stationary contact terminals located in said tank, and removable switch mechanism comprising a bridging contact and a pair of intermediate contact terminals, which latter are interposed between and engaged by said bridging contact member and engaging the respective stationary contact terminals when the switch mechanism is in place in the tank and the switch is closed, said intermediate contact members each comprising two yieldable members for engagement by the bridging contact member and with the corresponding stationary contact terminal respectively.

30. In a switch, the combination of an oil tank, and relatively movable coöperating contact members having plane engaging surfaces oblique to the direction of such relative movement, one of said contact members being rectilinearly yieldable obliquely to such direction of relative movement, said contact members being normally located in said oil tank and being movable therefrom as a unit.

31. In combination, a stationary oil tank, and a switch composed of relatively movable members normally within said tank, said switch being removed from said tank as a unit, one of said relatively movable members being compressible and another by its movement causing the compressible one to be compressed.

32. In a switch, a pair of relatively movable contacts, an intermediate compressible contact, means for actuating one of said pair of relatively movable contacts to cause said intermediate contact to be compressed between said relatively movable contacts, and means for insuring that the current-carrying capacity of the compressible contact between the portions thereof that engage the relatively movable contacts remains approximately constant during all operative conditions.

Milwaukee, Wisconsin, November 13, 1909.

In testimony whereof I affix my signature, in the presence of two witnesses.

HERBERT W. CHENEY.

Witnesses:
CHAS. L. BYRON,
ROB. E. STOLL.

---

It is hereby certified that in Letters Patent No. 1,088,769, granted March 3, 1914, upon the application of Herbert W. Cheney, of Milwaukee, Wisconsin, for an improvement in "Switches," an error appears in the printed specification requiring correction as follows: Page 8, line 46, after the word "contacts", insert a comma and the words, *the two members of a pair of compressible contact members;* and that the said Letters Patent should be read with this correction therein that the same may conform to the record of the case in the Patent Office.

Signed and sealed this 24th day of March, A. D., 1914.

[SEAL.]

J. T. NEWTON,

*Acting Commissioner of Patents.*